March 10, 1959  G. H. PEGUET ET AL  2,877,029
SHAFT PACKINGS
Filed March 12, 1954  4 Sheets-Sheet 1
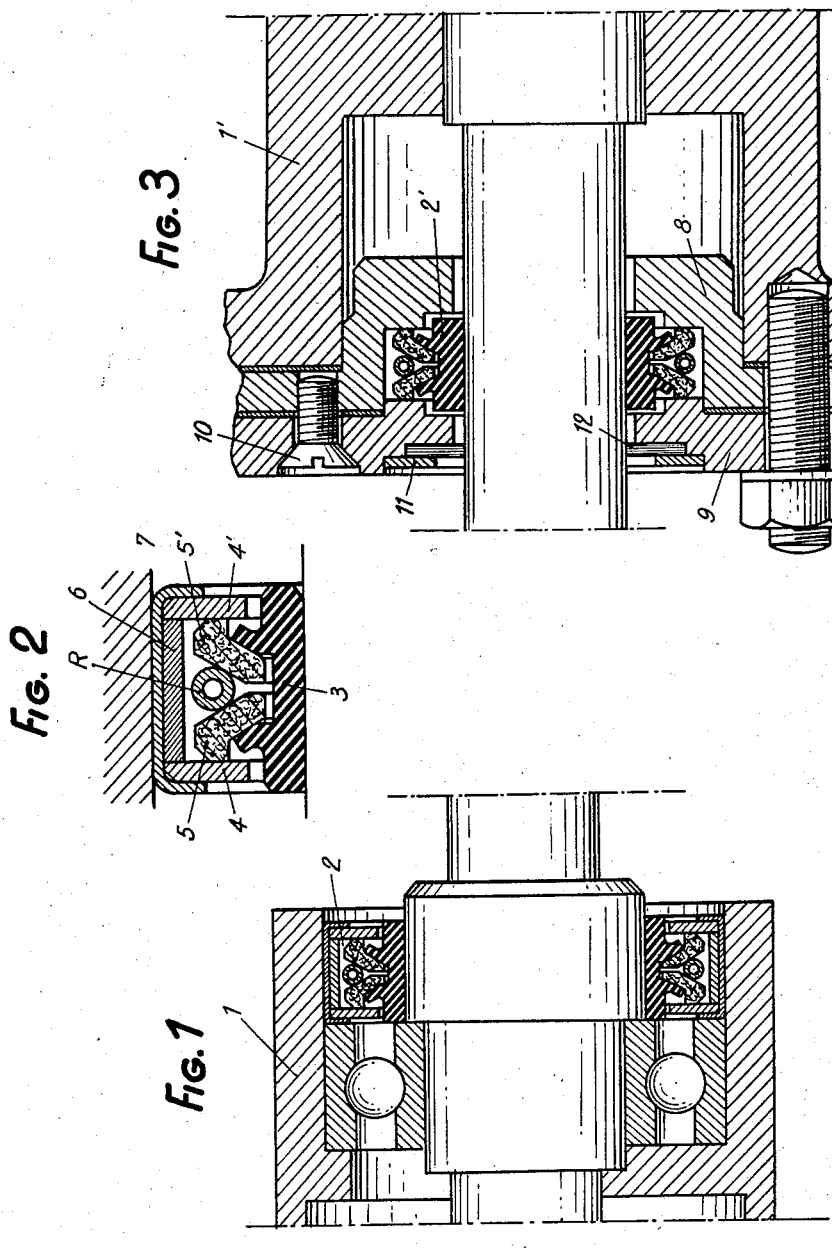

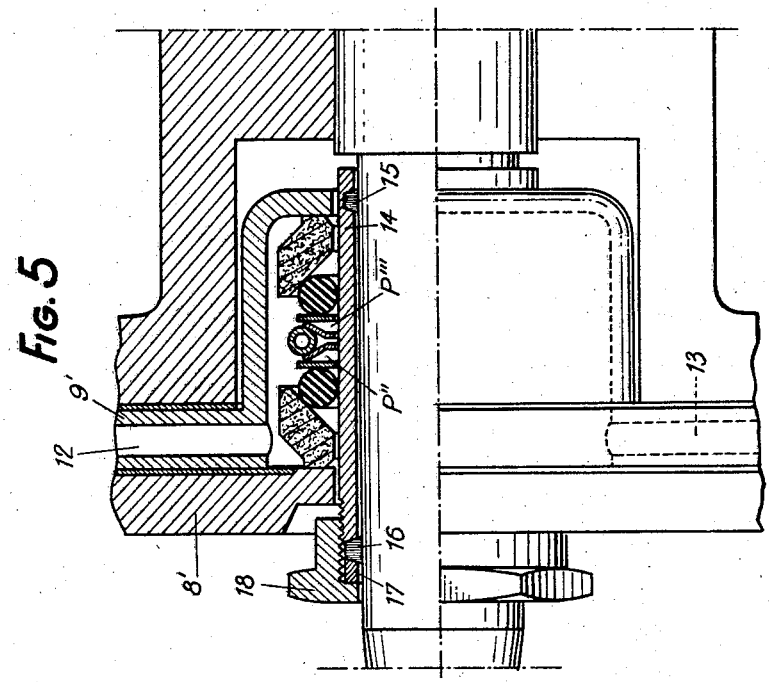
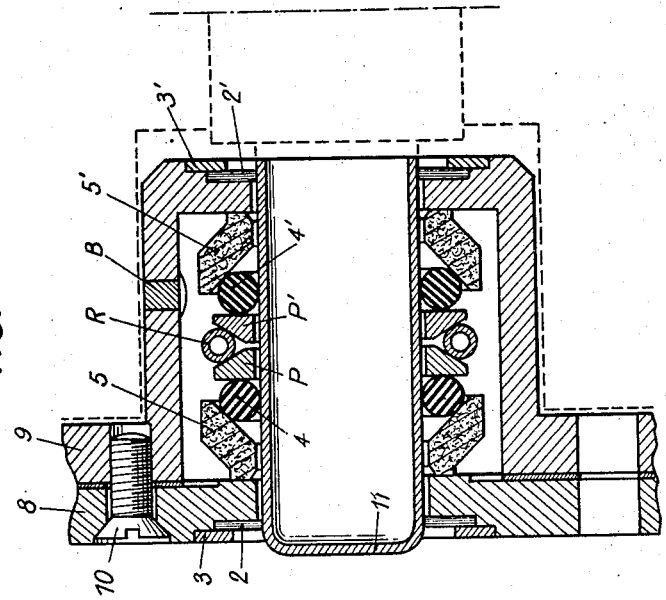

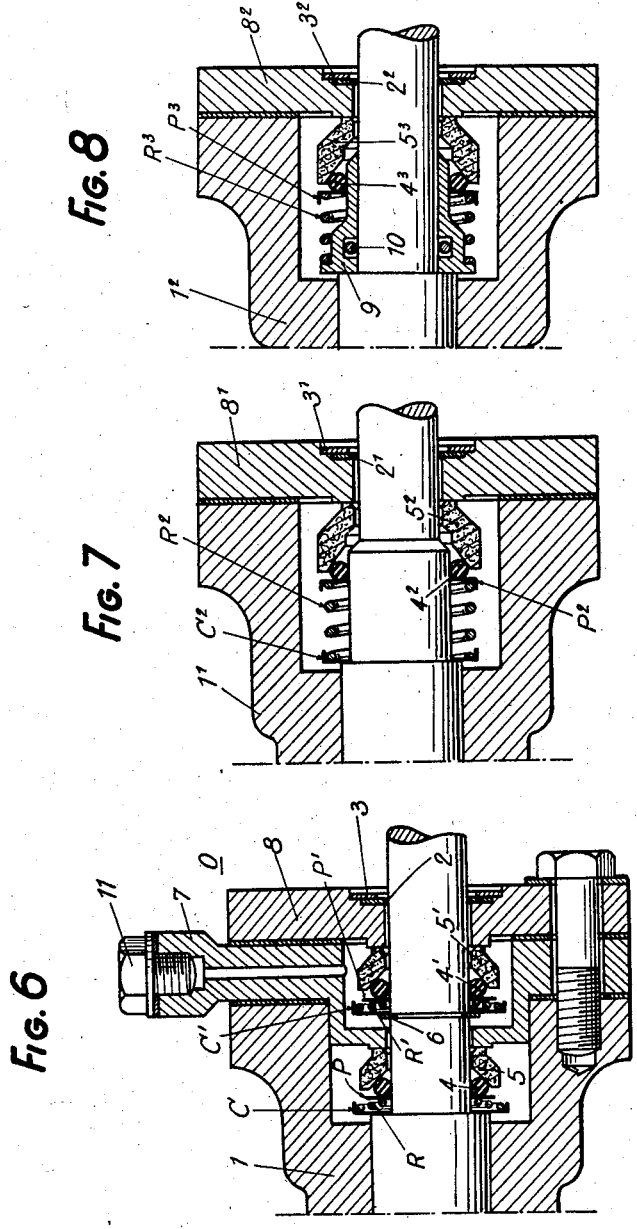

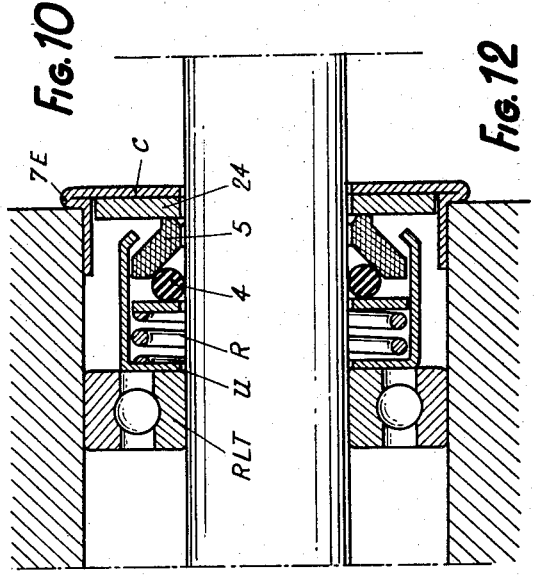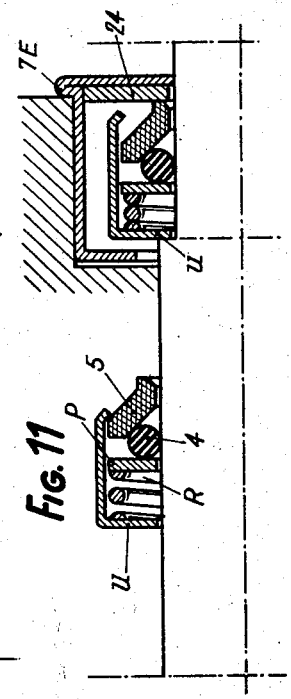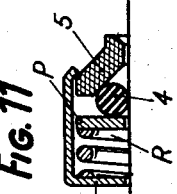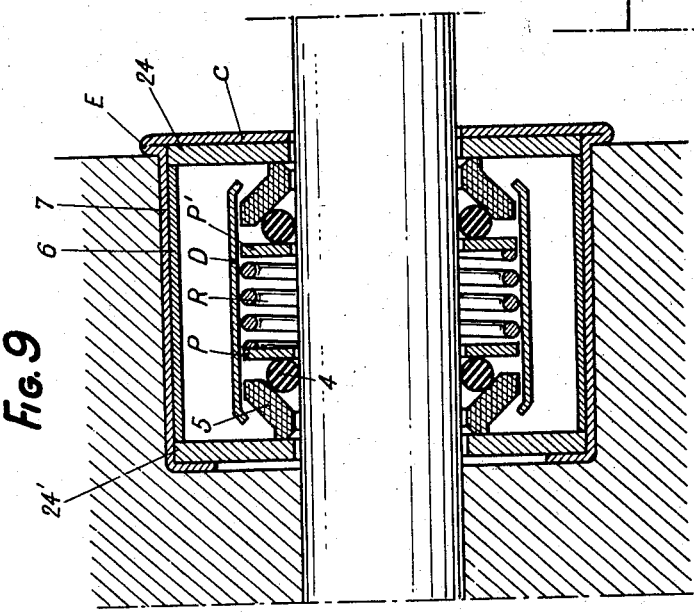

United States Patent Office 2,877,029
Patented Mar. 10, 1959

2,877,029

SHAFT PACKINGS

Georges H. Peguet, Paris, and André Guyennon, Montpellier, France

Application March 12, 1954, Serial No. 415,937

Claims priority, application France March 14, 1953

2 Claims. (Cl. 286—11.15)

This invention relates to rotary shaft packings, that is to say, mechanical seals of the type used to prevent a fluid from leaking along a rotary shaft beyond a certain plane at right angles to the axis of rotation of said shaft and beyond a certain radial distance. Devices of this type are known which consists of a member of resilient or yieldable material such as synthetic rubber or leather, urged against the peripheral surface of the shaft by a spring, said member being located within a metal case fitted in an adequate recess provided in the machine to be protected; this resilient member is fast with the case and the shaft rotates in the member, the latter being held against rotation. The contact between the resilient member and the shaft is maintained by spring means for ensuring the fluid-tightness along the shaft; on the other hand, the fluid-tightness around the case is maintained by the force fitting therein in the said recess.

Other known devices make use of an elastic sleeve pressed against the shaft, on which is fitted a friction ring acted upon by a spring bearing at one end upon a casing fitted to the friction ring, at the other end upon a metallic part fitted to said sleeve.

In still other devices, use is made of a casing which is independent of the shaft, is pressed into a seat bored into the machine and contains the following three elements: a friction member, an elastic sleeve and a spring, the elastic sleeve being independent of the shaft.

The disadvantage of these devices resides in the first case, in the necessity of sticking or clamping the friction piece on the elastic sleeve in order to drive it, and in the second case, in the necessity of providing a very exactly reamed seat for locating under pressure the aforesaid metallic casing.

The main idea of the present invention is to locate, in a casing independent of the machine which is to be rendered tight, a friction ring having an inner cone-shaped surface, a toroidally shaped rubber ring pressed against the first ring, an intermediary washer and a spring, all of these elements simply bearing one on each other and being able to slide axially inside said casing, the edge of which is bent so as to prevent said parts from leaving same.

In the accompanying drawings:

Figure 1 is a sectional view showing a first embodiment of a rotary shaft packing according to the invention;

Figure 2 shows the same mounting at a greater scale and in radial section;

Figure 3 is a sectional view showing the manner in which the rotating parts are held in position by a sealing flange provided with gasket and bolt means, without any force fit;

Figure 4 shows another embodiment of the invention;

Figure 5 shows a modified mounting of the device illustrated in Fig. 4;

Figure 6 shows a specific arrangement of the rotating parts when a shaft shoulder is available;

Figures 7 and 8 show other specific arrangements wherein pressure-balancing conditions are obtained;

Figures 9 to 12 show other specific arrangements wherein the sealing members are enclosed in a cylindrical case whereby the assembly may be mounted as a unit; Fig. 9 shows a double seal enclosed in a metal case, Fig. 10 shows a simple unit for protecting a bearing according to the arrangement of Fig. 9, Fig. 11 shows an axial frusto-conical sealing member located in its metal retaining sleeve and in expanded condition, and Fig. 12 shows the metal retaining sleeve urged against a shaft shoulder, the axial frusto-conical sealing member being receded therein.

Referring first to Figs. 1 and 2, the resilient member 3 is mounted on a dummy shaft (not shown in Fig. 2) and surrounded by a member 1. Substantially frusto-conical ring members 5, 5', preferably of plastic or like moulded material are mounted on the resilient member 3, so that the inner faces of the flanges formed on the peripheral outer surface of this member 3 will engage the outer faces of the aforesaid ring members 5, 5'. A spring of any suitable shape or type, but preferably of toroidal form, is mounted at R between the two ring members 5, 5' and urges the latter away from each other so as to increase the sealing effect between these ring members and the flanges of the resilient member 3. A pair of flat discs 14, 14' act as fixed thrust members for the parts 5, 5'; a distance piece 6 is mounted between these thrust members, as shown, and a case 7 is fitted thereon and has an end flange inturned so as to hold the parts together. This device may be fitted on a machine to be protected by so presenting it that by applying an axial thrust thereon it will be a medium force fit in the recess or chamber provided for this purpose, the machine driving shaft replacing the dummy shaft as it is subsequently withdrawn. As it rotates, the shaft carries along the part 3 causing in turn the parts 5, 5' and also the spring R to rotate therewith. The thrust faces of parts 5, 5' are in sliding contact with the corresponding faces of discs 14, 14', thereby ensuring the radial fluid-tightness of the system, the axial tightness being ensured by the central part 3 rotating with the shaft.

It will be readily understood that a similar packing device may be devised which, without departing from the invention, would comprise but a single rotating thrust member, but in most cases it is preferable to employ two thrust members so that one will protect the other against the ingress of inner impurities likely to leak from the machine to be protected; therefore, the most suitable oil may be used in the packing.

Fig. 3 shows the way how to mount the packing of Figs. 1 and 2 by means of two cooperating plates 8 and 9 held together by bolts 10 and using sealing plates 12 and 12'.

Fig. 4 shows an oil-bath packing the outer case of which contains the rotating parts of the unit; this form of embodiment is particularly advantageous in the construction of refrigerator compressors. With this device it is possible by convenient holes to supply the seal chamber with an oil independent of the refrigerating circuit of the compressor and protected against the impurities likely to circulate through this circuit.

On a dummy shaft II are mounted the rotating thrust members 5, 5' surrounding the resilient toroidal members 4, 4' and having a substantially conical inner surface. A pair of wedge-sectioned parts P, P' (or metal pressings such as P'', P''', Fig. 5) have a conical face and a flat face. The flat faces bear against the toroidal parts 4, 4'; between the conical and registering faces a toroidal spring R is mounted. The thrust members 5, 5' rotate on and slidably engage, the parts 8 and 9 forming the inner end walls of the case and acting as stationary thrust members. The parts 8 and 9 may be assembled in any desired manner provided that they form together a box-like structure containing the rotating unit.

It is obvious that the pressure exerted by the spring R will push pieces P and P' away one from the other and will ensure a thorough contact between the conical inner faces of pieces 5, 5' and the rings 4, 4' on the one hand, and between pieces 8, 9 and the front faces of said pieces 5, 5' on the other hand.

It will be evident to anybody conversant with the art that the shapes of the rotating parts may be modified without departing from the invention, but obviously the use of parts such as P and P' and the toroidal spring R is advantageous in that it reduces the longitudinal and diametral dimensions of the assembly, provided that the parts supporting the toroidal spring are so shaped that the spring force tends to move them away from each other, the radial components of this force being statically absorbed by these parts, the axial components being transmitted through these same parts to the rotating thrust members. By providing properly positioned holes such as 12 and 13 in parts 8 and 9, it is possible to fill and drain the box-like case when necessary (Fig. 5). This figure also shows the mounting of sealing members 15 and 16 of resilient material in a sleeve member 11' held by ring 17 and a nut 18, so as to seal the sleeve member relative to the shaft. It will be understood that toroidal spring R will be always chosen in order to develop a sufficient centripetal force for maintaining the seal members against the fixed machine parts in spite of the centrifugal force tending to move it radially.

Figure 6 shows another form of mounting according to this invention, wherein the rotating thrust members are not in opposition. The thrust springs consist, preferably, of telescopic springs R' bearing through spring locating rings C and C' against a shaft shoulder or a retaining ring 20 mounted on the shaft. The member 5 protects the box-like structure consisting of parts 8' and 9'; the part 21 is a resilient washer held in the member 9' by the metal washer 22 in order to prevent the ingress of foreign particles from the outside. It is not possible to mount this device separately from the machine, but it may prove useful for certain manufacturers. As in the self-contained case, the two case-forming parts act as stationary thrust members with respect to the rotating parts, thereby providing the radial seal.

Fig. 7 shows a seal mounting in a chamber in which a relatively high pressure is maintained; the resilient member $4^2$ is mounted on a shaft portion having a greater diameter than the projecting portion of this shaft; thus, the diameter of the thrust face of member $5^2$ may be smaller than the shaft diameter on which the member $4^2$ is mounted and therefore the thrusts resulting from pressure differences in the chamber may be balanced. the spring $R_2$ acting on the seal member is mounted between two retaining washers $C_2$, $C'_2$ threaded on the shaft.

Fig. 8 shows the manner in which the same result may be obtained by providing a sleeve member bearing against the single shaft shoulder, the resilient member 23 sealing the sleeve member 19 on the shaft.

Fig. 11 shows a general arrangement of the sealing members as it may be used in any embodiments of the kind above referred to. A ring-shaped sealing piece 4 is mounted on said shaft, A frusto-conical sleeve 5 of deformable material is loosely mounted on said shaft and substantially around the ring 4. A spring or the like R acts on said ring 4 through the medium of a plate P. The spring R together with the plate P, ring 4 and a part of sleeve 5 are contained in a casing U belonging to a machine or the like.

The operation of this device is very simple. The shaft and the casing U are adapted for relative motion one with respect to the other. It may for instance be supposed that the shaft rotates, whereas the casing U is stationary. In this case, the casing U will exert a thrust on ring 4 due to the position of spring R and will provide for a contact between pieces 4 and 5. It is apparent that the tightness will be ensured (as also shown on Fig. 12) in the following two ways:

(1) An axial tightness due to ring 4,
(2) A radial tightness due to the pressure contact between ring 4 and the inner conical surface of sleeve 5 and also to the contact of the outer face of sleeve 5 and a stationary surface (24 on Fig. 12).

Fig. 12 illustrates how pressure or vacuum may develop within the metal retaining sleeve U; in this case the pressure exerted against the conical member and the toroidal resilient member is balanced. The bearing or thrust surfaces may be so calculated that a fluid-pressure increase will be attended by a slight increase in the thrust pressure of the sealing face of the conical member against its stationary thrust member.

Figure 9 shows an analogous arrangement in case of a device of the double-seal type wherein the sleeve U is replaced by a jacket D, the end parts of which act as retaining flanges for the seal members 5 and 5'. The assembly is located in a case 7 provided with a shoulder E by which this case bears against a wall of the recess wherein it is fitted.

Figure 10 shows a device of the single-seal type wherein the sleeve U bears against the cage of a ball bearing RLT and the case 7 is interrupted and has only the shape of a collar.

It is also apparent that the sealing members shown in Fig. 11 may be used in the arrangements shown in Figs. 1 and 9 without departing from the invention.

Of course, the invention is not limited to the specific forms of embodiment shown and described herein by way of example, as many modifications may be brought thereto without departing from the spirit and scope of the invention.

What we claim is:

1. A packing device for ensuring a fluid-tight connection between two relatively rotating members comprising, a first toroidal ring-shaped, seal member of deformable material tightly fitted on one of said rotating members, a second ring-shaped seal member of generally hollow frusto-conical shape and having an external radial surface slidably engaging the radial surface of an end member adapted to rotate with the other of said rotating members relative to said one rotating member, said first seal member being coaxial with and at least partially located inside said second seal member, a helical compression spring coaxial to said seal members for pressing said first seal member against and into said second seal member and said second seal member against said end member, a flat disc disposed between said spring and said first seal member, a retainer sleeve surrounding said seal members and said spring and having an apertured end wall against which said spring is seated and through which said one rotating member passes, said sleeve having an inturned edge remote from said end wall for engaging a surface of said second seal member adjacent its radial surface, thereby to retain said second seal member within said sleeve, a casing disposed about said sleeve and frictionally engaged in a recess in said other relatively rotating member, said casing having an end wall for supporting said end member and having an inturned edge remote from its end wall disposed behind said end wall of said sleeve.

2. The combination according to claim 1, wherein said second seal member is fabricated from self-lubricating synthetic material.

(References on following page)

References Cited in the file of this patent

UNITED STATES PATENTS

| | | |
|---|---|---|
| 1,861,275 | Hopkins | May 31, 1932 |
| 2,149,975 | McCormack | Mar. 7, 1939 |
| 2,182,072 | Czarnecki | Dec. 5, 1939 |
| 2,231,690 | Sheldrick et al. | Feb. 11, 1941 |
| 2,243,227 | Stratton | May 27, 1941 |
| 2,374,353 | Jacobsen | Apr. 24, 1945 |
| 2,422,007 | Gilbert | June 10, 1947 |
| 2,429,953 | Bottomley | Oct. 28, 1947 |
| 2,695,799 | Chambers et al. | Nov. 30, 1954 |
| 2,712,461 | Batchelder | July 5, 1955 |

FOREIGN PATENTS

| | | |
|---|---|---|
| 752,065 | France | July 10, 1933 |